United States Patent [19]

Wang

[11] Patent Number: 4,833,973

[45] Date of Patent: May 30, 1989

[54] PRESSURE ACTUATED ASSEMBLY EXTENDABLE BY FLUID PRESSURE AND RETRACTABLE BY SPRING ACTION

[76] Inventor: John Wang, No. 129, Tuan-Chu Lane, Tuan-Chu Li, Chiayi City, Taiwan

[21] Appl. No.: 197,859

[22] Filed: May 24, 1988

[51] Int. Cl.[4] ...................... F15B 11/08; F15B 13/04; F01B 19/00; F16J 3/00

[52] U.S. Cl. .......................................... 91/468; 92/36; 92/90; 92/92; 297/347; 267/131; 267/117

[58] Field of Search .................. 92/36, 40, 41, 42, 43, 92/44, 47, 103 S, 103 D, 58, 60, 80, 81, 82, 92, 93, 95, 99, 98, 143, 163; 91/5, 432, 468, 437, 446, 451, 452; 297/347; 248/161, 562, 636, 550; 267/117, 131

[56] References Cited

U.S. PATENT DOCUMENTS

| | | | |
|---|---|---|---|
| 1,928,368 | 9/1933 | Coffey | 92/90 |
| 2,388,741 | 11/1945 | Hays | 92/90 |
| 2,441,881 | 5/1948 | Hays | 92/90 |
| 2,465,560 | 3/1949 | Warnke | 92/36 |
| 2,789,580 | 4/1957 | Woods | 92/47 |
| 2,832,586 | 4/1958 | Grudin | 92/90 |
| 2,947,326 | 8/1960 | Mercier | 92/90 |
| 3,020,981 | 2/1962 | Day | 92/90 |
| 3,143,332 | 8/1964 | Watlington | 297/347 |
| 3,151,706 | 10/1964 | Dullenburger et al. | 92/90 |
| 3,212,447 | 10/1965 | Browne | 92/90 |
| 3,235,221 | 2/1966 | Conner | 267/131 |
| 3,632,077 | 1/1972 | Hall et al. | 267/131 |
| 3,712,603 | 1/1973 | Hickinbotham | 267/131 |
| 4,465,266 | 8/1984 | Hale | 267/131 |
| 4,538,854 | 9/1985 | Wilson | 297/347 |
| 4,593,951 | 6/1986 | Slaats et al. | 297/347 |

FOREIGN PATENT DOCUMENTS

| | | | |
|---|---|---|---|
| 461562 | 12/1951 | Italy | 92/92 |
| 2185799 | 7/1987 | United Kingdom | 267/131 |

*Primary Examiner*—Robert E. Garrett
*Assistant Examiner*—Thomas Denion

[57] ABSTRACT

A fluid pressure actuated assembly includes a casing made of a flexible resilient material, such as rubber or polyurethane, a coiled tension spring sleeved on the casing for biasing the casing to move toward a retracted position, and a coiled spacing spring interposed between the tension spring and the casing for preventing any wall of the casing from being clamped between any two adjacent turns of the tension spring. When a compressed fluid is applied to the interior of the casing, the casing extends.

12 Claims, 3 Drawing Sheets

PRESSURE ACTUATED ASSEMBLY EXTENDABLE BY FLUID PRESSURE AND RETRACTABLE BY SPRING ACTION

BACKGROUND OF THE INVENTION

This invention relates to a pressure actuated assembly which can extend and retract, and more particularly to a pressure actuated assembly extendable by fluid pressure and retractable by spring action.

A fluid pressure actuated assembly is commonly used in a pressure gauge, a height-adjustable chair, and the like. It typically employs a hydraulic cylinder in which a piston moves. The hydraulic cylinder type assemblies suffer from the following disadvantages:

(1) The space between the piston and the cylinder wears easily, even if various oil rings are provided therebetween.

(2) When substantial liquid pressure is applied to the interior of the hydraulic cylinder, the resulting leakage of hydraulic oil may occur in the hydraulic cylinder, causing inaccurate travel of the piston.

(3) When a movable mechanical component is associated with the hydraulic cylinder, if the displacement of the mechanical component is dependent on the travel of the piston, the leakage of the hydraulic oil in the hydraulic cylinder will cause inaccurate displacement of the mechanical component.

SUMMARY OF THE INVENTION

It is therefore the main object of this invention to provide a simple pressure acutuated assembly extendable by fluid pressure and retractable by spring action.

According to this invention, a fluid pressure actuated assembly includes a casing made of a flexible resilient material, such as rubber or polyurethane, a coiled tension spring sleeved on the casing for biasing the casing to a retracted position, and a coiled spacing spring interposed between the tension spring and the casing for preventing any wall of the casing from being clamped between any two adjacent turns of the tension spring.

BRIEF DESCRIPTION OF THE DRAWINGS

Other features and advantages of this invention will become apparent in the following detailed description of the preferred embodiments of this invention with reference to the accompanying drawings in which.

DETAILED DESCRIPTION OF THE PREFERRED EMBODIMENTS

Figure 1:
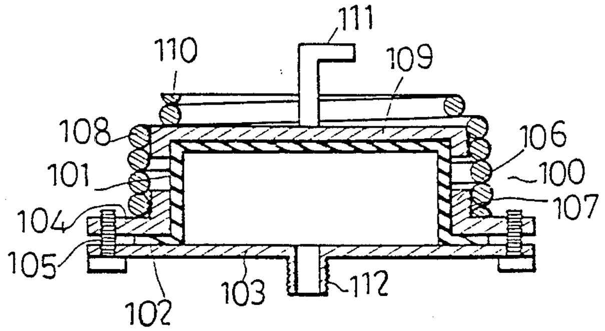
FIG. 1 is a sectional view of a gas pressure actuated assembly according to a first embodiment of this invention.

Referring to FIG. 1, a gas pressure actuated assembly 100 of this invention includes a hollow cylindrical casing 101 of rubber which has a closed upper end, an open lower end, and a lower end outward flange 102. The lower end outward flange 102 is clamped between a base 103 and a rigid lower ring 104 which is fastened to the base 103 by lock belts 105 for establishing an airtight seal between the lower ring 104 and the base 103. The lower ring 104 has an upward annular projection 106 extending upward from its inner periphery. The upward projection 106 has external threads 107 on which the lower end of a first coiled tension spring 108 is tightly sleeved. A rigid upper disk 109 has a downward annular projection extending downward from its outer periphery so that the closed end of the casing 101 is capped with the upper disk 109. Because the upper disk 109 is retained between the closed end of the first casing 101 and a diameter-reduced fastening turn 110 of the first tension spring 108, the casing 101 is biased by the first tension spring 108 to move toward a retracted position shown in FIG. 1. A pressure indicating means 111 (only part of which is shown) is installed on the upper disk 109 so as to indicate the pressure valve in accordance with the displacement of the upper disk 109.

When a compressed gas is applied to the interior of the casing 101 through an adapter 112 provided on the base 103, the casing 101 extends upward a distance proportional to the magnitude of the pressure applied so that the pressure indicating means 111 indicates the pressure to be measured in accordance with the displacement of the upper disk 109.

Figure 2:
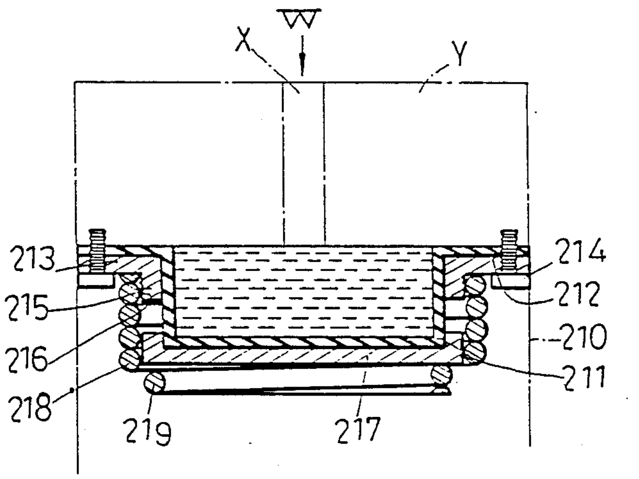
FIG. 2 is a sectional view of a liquid pressure actuated assembly according to a second embodiment of this invention.

Referring to FIG. 2, a liquid pressure actuated assembly 210 of this invention includes a hollow cylindrical oil tank 211 of a flexible resilient material, such as rubber or polyurethane, which has a closed lower end, an open upper end, and an upper end outward flange 212. The oil tank 211 is filled with hydraulic oil. The upper end outward flange 212 is clamped between a mechanical component Y and an upper ring 213 which is fastened to the component Y by lock belts 215 for establishing a liquid-tight seal between the upper ring 213 and the component Y. The upper ring 213 has a downward annular projection 215 extending from its inner periphery. The downward projection 215 has external threads 216 on which the upper end of a second coiled tension spring 218 is tightly sleeved. A rigid lower disk 217 has an upward annular projection extending from its outer periphery so that the closed end of the oil tank 211 is capped with the lower disk 217. Because the lower disk 217 is retained between the closed end of the oil tank 211 and a diameter-reduced fastening turn 219 of the second tension spring 218, the oil tank 211 is biased by the second tension spring 218 to move toward a retracted position shown in FIG. 2.

The mechanical component Y is formed therethrough with a vertical oil flow path X which is communicated with the interior of the oil tank 211 at its lower end. In use, a hydraulic apparatus may be connected to the upper end of the component Y, as described hereinafter in detail. Upon the application of a load W to the hydraulic apparatus, the hydraulic oil increased in the oil tank 211 causes the oil tank 211 to extend downward. When the load W is removed from the hydraulic apparatus, the oil tank 211 retracts to extrude the previously increased hydraulic oil therefrom through the oil flow path X.

Figure 3:
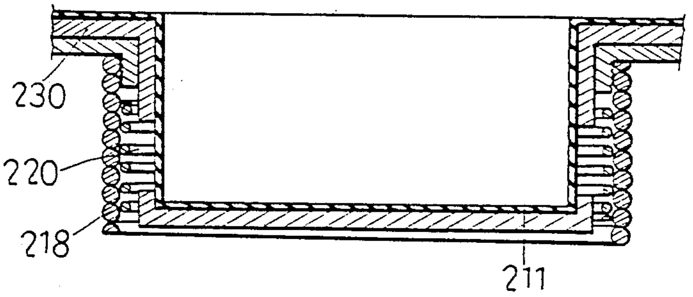
FIG. 3 is a sectional view of a liquid pressure actuated assembly according to a third embodiment of this invention.

Referring to FIG. 3, to prevent any wall of the oil tank 211 from being clamped by any two adjacent turns of the second tension spring 218 when the oil tank 211 is retracted, a coiled spacing spring 220 may be interposed between the second tension spring 218 and the oil tank 211. The length of the spacing spring 220 is much smaller than the second tension spring 218. Furthermore, to prevent the oil tank 211 from being hurt by the ends of the spacing spring 220, a rigid protective ring 230 may be provided therebetween.

Figure 4:
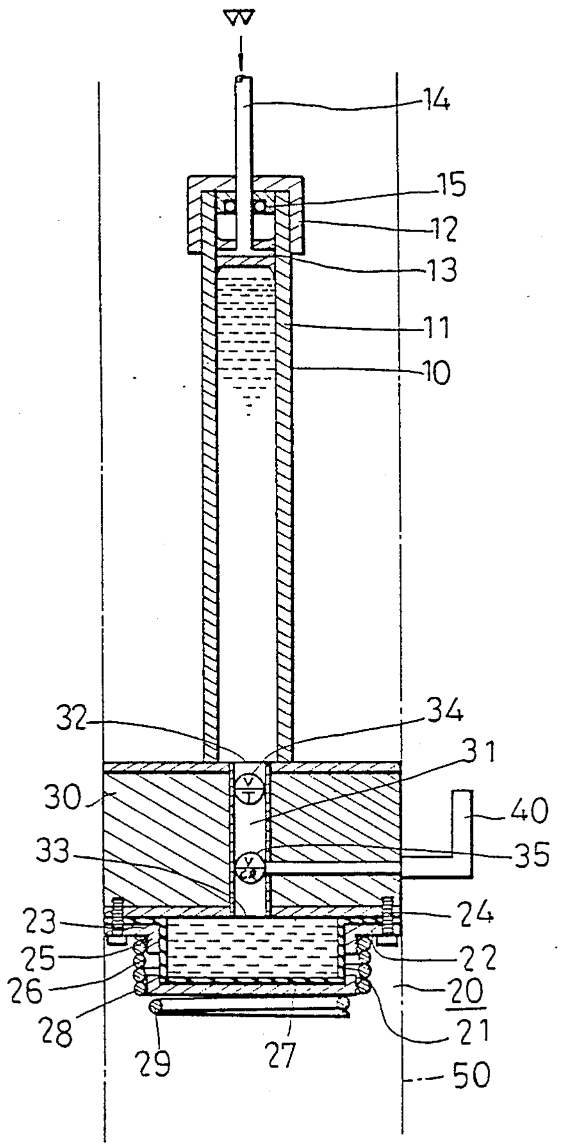
FIG. 4 is a schematic sectional view illustrating how to employ the assembly of this invention in an automatically ascending apparatus, such as a height-adjustable chair.

FIG. 4 shows the association of an oil pressure actuated assembly 20 of this invention with a hydraulic cylinder 10 which includes a cylinder body 11, an upper cover 12, a piston 13, a piston rod 14, and an oil seal 15. The seat of a height-adjustable chair (not shown), represented by a character W, is secured to the upper end of the piston rod 14.

The oil pressure actuated assembly 20 includes an oil tank 21 which has a closed lower end, an open upper end, and an upper end outward flange 22. The oil tank 21 is filled with hydraulic oil. The upper end outward flange 22 is clamped between a connecting block 30 and an upper ring 23 which is fastened to the block 30 by lock belts 24 for establishing a liquid-tight seal between the upper ring 23 and the block 30. The upper ring 23 has a downward annular projection 25 extending from its inner periphery. The downward projection 25 has external threads 26 on which thê upper end of a third coiled tension spring 28 is tightly sleeved. A rigid lower disk 27 has an upward annular projection extending from its outer periphery so that the closed end of the oil tank 21 is capped with the lower disk 27. Because the lower disk 27 is retained between the closed end of the oil tank 21 and a diameter-reduced fastening turn 29 of the third tension spring 28; the oil tank 21 is biased by the third tension spring 218 to move toward a retracted position shown in FIG. 4.

The connecting block 30 connects the oil pressure actuated assembly 20 to the hydraulic cylinder 10 and is formed therethrough with a vertical oil flow path or oil pipe 31 which is intercommunicated at its two ends 32 and 33 with the hydraulic cylinder 10 and the oil tank 21. A throttle valve 34 is installed in the oil pipe 31 for regulating the oil flow from the hydraulic cylinder 10 to the oil tank 21. With the throttle valve 34 provided in the oil pipe 31, when the piston rod 14 is depressed, the oil will flow slowly from the hydraulic cylinder 10 to the oil tank 21. A stop valve 35 is also installed in the oil pipe 31 and equipped with a control handle 40 so that it can be manually closed to stop the oil flow between the hydraulic cylinder 10 and the oil tank 21.

In operation, when nobody sits on the chair seat W and the stop valve 35 is open, the tension force of the third tension spring 28 causes the oil tank 21 to retract so that the oil flows from the oil tank 21 to the hydraulic cylinder 10, thereby ascending the piston rod 14 to an upper limit position. When it is desired to adjust the height of the chair seat W, the stop valve 35 is opened, and then the operator sits on the chair seat W so that the chair seat W descends slowly until it reaches a desired position. Subsequently, the stop valve 35 is closed to locate the chair seat W in the desired position. It is understood that the oil tank 21 extends while the piston rod 14 descends.

With this invention thus explained, it is apparent that numerous modifications and variations can be made without departing from the scope and spirit of this invention. It is therefore intended that this invention be limited only as indicated in the appended claims.

I claim:

1. A pressure actuated assembly comprising:

a casing made of a flexible resilient material and having a closed end and an open end adapted to be connected to a pressure source, said casing being a hollow cylinder and said open end having an outward flange arranged to function as a leak;

an elastomeric body connected to an outer surface of said casing for biasing said causing to move toward a retracted position; and a rigid ring secured to said outward flange, including an externally threaded annular projection extending from its inner periphery, an end of said elastomeric body being sleeved tightly on a threaded portion of said projection so that said casing is biased by said elastomeric body to move toward the retracted position;

whereby, when pressure is applied to interior of said casing through said open end, said casing extends a distance proportional to magnitude of said pressure; when said pressure is released from said casing, said casing is biased by said elastromeric body to return to the retracted position.

2. A pressure actuated assembly as claimed in claim 1, wherein said casing is made of rubber,

3. A pressure actuated assembly as claimed in claim 1, wherein said casing is made of polyurethane.

4. A pressure actuated assembly as claimed in claim 1, wherein said casing is filled with hydraulic oil.

5. A pressure actuated assembly as claimed in claim 1, wherein said elastomeric body is a coiled tension spring sleeved on said casing.

6. A pressure actuated assembly as claimed in claim 5, wherein a coiled spacing spring is interposed between said casing and said tension spring, said spacing spring being of a length much smaller than that of said tension spring for preventing any wall of said casing from being clamped by any two adjacent turns of said tension spring when said casing is retracted.

7. A pressure actuated assembly as claimed in claim 5, wherein a rigid ring is secured to said outward flange and includes an externally threaded annular projection extending from its inner periphery, an end of said tension spring being sleeved tightly on a threaded portion of said projection so that said casing is biased by said tension spring to move toward the retracted position.

8. A pressure actuated assembly as claimed in claim 1, wherein a rigid disk is provided between said closed end of said casing and said elastomeric body so as to be biased by said elastomeric body to push said closed end of said casing toward said open end of said casing.

9. A pressure actuated assembly as claimed in claim 1, wherein said pressure source is a hydraulic cylinder which has a piston rod for carrying a load thereon, and wherein said casing is an oil tank communicated with interior of said hydraulic cylinder.

10. A pressure actuated assembly as claimed in claim 9, wherein a throttle valve is disposed in an oil flow path between said hydraulic cylinder and said oil tank for regulating oil flow between said hydraulic cylinder and said oil tank.

11. A pressure actuated assembly as claimed in claim 9, wherein a stop valve is disposed in an oil flow path between said hydraulic cylinder and said oil tank and may be manually closed to stop oil flow between said hydraulic cylinder and said oil tank.

12. A pressure actuated assembly as claimed in claim 9, wherein a connecting block is connected between said hydraulic cylinder and said oil tank, and wherein an oil flow path is formed through said block between said hydraulic cylinder and said oil tank.

* * * * *

UNITED STATES PATENT AND TRADEMARK OFFICE
CERTIFICATE OF CORRECTION

PATENT NO. : 4,833,973
DATED : May 30, 1989
INVENTOR(S) : John Wang

It is certified that error appears in the above-identified patent and that said Letters Patent is hereby corrected as shown below:

Col. 2, line 36, "215" should be --214--.

Col. 3, line 67, insert --,-- after "closed end".

Col. 4, line 2, "leak" should be --seal--.

Col. 4, line 4, "causing" should be --casing--.

Col. 4, line 21, "," should be --.--.

Signed and Sealed this

Third Day of April, 1990

*Attest:*

HARRY F. MANBECK, JR.

*Attesting Officer*

*Commissioner of Patents and Trademarks*